(12) United States Patent
Jin et al.

(10) Patent No.: US 11,842,561 B2
(45) Date of Patent: Dec. 12, 2023

(54) PROTECTIVE FILM AND ELECTRONIC DEVICE INCLUDING SAME

(71) Applicant: Samsung Electronics Co., Ltd., Gyeonggi-do (KR)

(72) Inventors: Yunjang Jin, Gyeonggi-do (KR); Youjin Kim, Gyeonggi-do (KR); Suna Kim, Gyeonggi-do (KR); Min Park, Gyeonggi-do (KR); Bongjae Rhee, Gyeonggi-do (KR); Yongwon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 17/277,787

(22) PCT Filed: Sep. 20, 2019

(86) PCT No.: PCT/KR2019/012279
§ 371 (c)(1),
(2) Date: Mar. 19, 2021

(87) PCT Pub. No.: WO2020/060318
PCT Pub. Date: Mar. 26, 2020

(65) Prior Publication Data
US 2021/0350109 A1   Nov. 11, 2021

(30) Foreign Application Priority Data
Sep. 21, 2018  (KR) .................. 10-2018-0113816

(51) Int. Cl.
*G06V 40/13*   (2022.01)
*G06F 3/041*   (2006.01)
(Continued)

(52) U.S. Cl.
CPC ............ *G06V 40/1329* (2022.01); *B32B 7/12* (2013.01); *B32B 27/08* (2013.01); *B32B 27/308* (2013.01);
(Continued)

(58) Field of Classification Search
CPC .. G06V 40/1329; G06V 40/1306; B32B 7/12; B32B 27/08; B32B 27/308; B32B 27/32;
(Continued)

(56) References Cited

U.S. PATENT DOCUMENTS

2011/0148823 A1* 6/2011 Chen ..................... G06F 3/0446
345/176
2012/0099053 A1* 4/2012 Kamoshida ....... G02F 1/134363
349/96

(Continued)

FOREIGN PATENT DOCUMENTS

JP   2001-94089 A    4/2001
JP   2004-356535 A   12/2004
(Continued)

OTHER PUBLICATIONS

Korean Office Action dated Sep. 19, 2023.

*Primary Examiner* — Antonio Xavier
(74) *Attorney, Agent, or Firm* — Cha & Reiter, LLC

(57) ABSTRACT

Various embodiments disclosed in the present document relate to: a protective film configured to be attached to a display glass equipped with an ultrasonic fingerprint sensor; and an electronic device including the same. According to the various embodiments disclosed in the present document, a protective film can be provided, which is configured to be attached to an electronic device provided with an ultrasonic fingerprint sensor, the protective film comprising: a first adhesive layer configured to be attached on a front plate of the electronic device; and a first substrate layer stacked and
(Continued)

disposed on one surface side of the first adhesive layer, integrated with the first adhesive layer, and covering the front plate.

15 Claims, 8 Drawing Sheets

(51) Int. Cl.
 *B32B 7/12* (2006.01)
 *B32B 27/08* (2006.01)
 *B32B 27/30* (2006.01)
 *B32B 27/32* (2006.01)
 *B32B 27/36* (2006.01)
(52) U.S. Cl.
 CPC .............. *B32B 27/32* (2013.01); *B32B 27/36* (2013.01); *B32B 27/365* (2013.01); *G06F 3/041* (2013.01); *G06V 40/1306* (2022.01); *B32B 2307/732* (2013.01); *B32B 2457/208* (2013.01)
(58) Field of Classification Search
 CPC . B32B 27/36; B32B 27/365; B32B 2307/732; B32B 2457/208; B32B 2250/24; B32B 3/02; B32B 27/34; B32B 2250/02; B32B 2307/20; B32B 2307/412; B32B 2307/7244; B32B 2307/7265; B32B 7/022; B32B 2307/748; B32B 2405/00; B32B 2571/00; G06F 3/041; G06F 3/0412; C09J 7/255
 See application file for complete search history.

(56) References Cited

U.S. PATENT DOCUMENTS

| | | | |
|---|---|---|---|
| 2014/0355388 A1* | 12/2014 | Kent | .................. B06B 3/00 367/140 |
| 2016/0114887 A1 | 4/2016 | Zhou et al. | |
| 2017/0121840 A1 | 5/2017 | Evans, V et al. | |
| 2017/0124372 A1 | 5/2017 | Evans, V et al. | |
| 2017/0315293 A1 | 11/2017 | Bang et al. | |
| 2018/0046836 A1 | 2/2018 | Hinger | |
| 2019/0095021 A1* | 3/2019 | An | .................. G02B 1/16 |

FOREIGN PATENT DOCUMENTS

| | | |
|---|---|---|
| JP | 2018-515820 A | 6/2018 |
| KR | 10-2017-0090339 A | 8/2017 |
| KR | 10-2017-0093192 A | 8/2017 |
| KR | 10-2017-0124160 A | 11/2017 |
| KR | 10-1872755 B1 | 6/2018 |

\* cited by examiner

PROTECTIVE FILM AND ELECTRONIC DEVICE INCLUDING SAME

CROSS-REFERENCE TO RELATED APPLICATION(S)

This application is a National Phase Entry of PCT International Application No. PCT/KR2019/012279, which was filed on Sep. 20, 2019 and claims priority to Korean Patent Application No. 10-2018-0113816, which was filed on Sep. 21, 2018 in the Korean Intellectual Property Office, the contents of which are incorporated herein by reference.

BACKGROUND

1. Field

Various embodiments disclosed in this document relate to a protective film configured to be attached to glass of a display in which an ultrasonic fingerprint sensor is embedded, and an electronic device including the same.

2. Description of the Related Art

In general, electronic devices denote devices, such as electronic organizers, portable multimedia players, mobile communication terminals, tablet PCs, video/sound devices, desktop/laptop computers, vehicle navigation systems, and the like, as well as home appliances, which perform specific functions according to installed programs. For example, these electronic devices may output stored information as sound or images. In line with an increase in the degree of integration in the electronic devices and generalization of ultra-high speed and large-capacity wireless communication, various functions have recently been provided to a single mobile communication terminal. For example, entertainment functions such as games, multimedia functions such as music/video playback, communication and security functions for mobile banking and the like, functions such as schedule management and electronic wallets, and the like, as well as communication functions, are being integrated into a single electronic device.

In recent years, a security function required to execute mobile banking, mobile credit cards, electronic wallets, and the like, as well as a function of protecting personal information stored in the electronic device, have been provided to the electronic devices, for example, portable electronic devices such as mobile communication terminals. By way of example, the security function installed in the electronic device may include passwords or lock patterns according to user settings, user authentication through security companies, and the like. The authentication method through a password or a security company may have a low security level due to the high possibility of leakage of the passwords, or may be a hassle because authentication requires the security company for intermediation. As an alternative thereto, a biometric authentication method, for example, a user authentication method using fingerprint or iris recognition, is able to increase user convenience while securing a considerable level of security.

In particular, the biometric authentication method is being widely applied, as a form of user authentication, to various electronic devices including portable electronic devices due to the advantages of convenience of possession, low risk of theft or imitation, and consistency of user's biometric information throughout life.

Among the biometric authentication methods, a user authentication method through fingerprint recognition primarily provides a fingerprint authentication function based on a biometric sensor disposed in the periphery of a lower end of a display area included in an electronic device or disposed on the surface of a case of an electronic device.

Biometric sensors may provide optical fingerprint recognition sensors using light, ultrasonic fingerprint recognition sensors using ultrasonic waves, capacitive fingerprint recognition sensors using the difference in capacitance, thermal fingerprint recognition sensors using heat emitted from the human body, and the like.

SUMMARY

For example, the optical fingerprint recognition sensor may irradiate the user's finger with light, and may detect an image corresponding to at least a portion of the user's fingerprint (e.g., a ridge portion or a valley portion) according to the shadow of a reflected light, thereby determining the shape and characteristics of the fingerprint. A fingerprint recognition sensor using ultrasonic waves may radiate ultrasonic waves on at least a portion of the user's fingerprint (e.g., a ridge portion or a valley portion), and may determine the shape and characteristics of the fingerprint by the intensity of a reflected wave and a change in the position thereof.

The optical fingerprint recognition sensors, among the previously known biometric sensors, are known to be competitive in price and yield and have high durability. However, in the case where the surface condition of an external object is poor (e.g., when the user's finger has a damage such as a scratch), or in the environment in which light having stronger intensity than the light emitted from the sensor is incident thereon, a fingerprint recognition rate may be sharply lowered.

On the other hand, an ultrasonic fingerprint recognition sensor is able to scan fine features of the skin epidermis layer using the excellent material permeability of ultrasonic waves. In addition, since it is little affected by the surrounding environment, the high accuracy of the sensor is obtained. Thanks to these advantages, the fingerprint recognition sensors using ultrasonic waves have recently proliferated based on high-end electronic devices.

Although the ultrasonic fingerprint recognition sensor has excellent material permeability, a thick protective film attached to the surface of an electronic device may degrade the fingerprint recognition rate. According to a certain embodiment, a thin protective film may be mounted on the surface of an electronic device, and if the protective film is thin, the protection performance of the protective film against scratch may be degraded, or adhesive strength may be lowered. That is, increasing the fingerprint recognition rate by making the protective film thin may not be a practical solution to the above-described problem.

This document is intended to provide a protective film capable of at least maintaining the inherent protection performance of the protective film without making the thickness thereof thin and preventing degradation of the fingerprint recognition rate of the ultrasonic fingerprint recognition sensor, and an electronic device including the same.

According to various embodiments disclosed in this document, there is provided a protective film configured to be attached to an electronic device equipped with an ultrasonic fingerprint recognition sensor, which includes: a first adhesive layer configured to be attached to a front plate of the electronic device; and a first substrate layer stacked on the first adhesive layer and covering the front plate, wherein at least one of the first adhesive layer and the first substrate layer is formed to have a thickness of ½nλ (where n is an integer n>0) with respect to the wavelength (λ) of an ultrasonic wave emitted from the ultrasonic fingerprint recognition sensor of the electronic device.

According to various embodiments disclosed in this document, there is provided an electronic device including: a housing including a front plate; a display mounted on at least one surface of the housing; an ultrasonic fingerprint recognition sensor configured to emit ultrasonic waves and obtain information related to a user's fingerprint using at least some of the ultrasonic waves reflected; and a protective film configured to be attached to the front plate, wherein the protective film includes a first adhesive layer configured to be attached to the front plate and a first substrate layer stacked on one surface of the first adhesive layer so as to be integral with the first adhesive layer and covering the front plate, and wherein at least one of the first adhesive layer and the first substrate layer is formed to have a thickness of ½nλ (where n is an integer n>0) with respect to the wavelength (λ) of an ultrasonic wave emitted from the ultrasonic fingerprint recognition sensor of the electronic device.

According to various embodiments disclosed in this document, there is provided a protective film configured to be attached to an electronic device equipped with an ultrasonic fingerprint recognition sensor, which includes: a first adhesive layer configured to be attached to a front plate of the electronic device; a second substrate layer stacked on top of the first adhesive layer; a second adhesive layer stacked on top of the second substrate layer; and a first substrate layer stacked on top of the second adhesive layer, wherein at least one of the first adhesive layer, the second substrate layer, the second adhesive layer, and the first substrate layer is formed to have a thickness of ½nλ (where n is an integer n>0) with respect to the wavelength (λ) of an ultrasonic wave emitted from the ultrasonic fingerprint recognition sensor of the electronic device.

According to various embodiments disclosed in this document, it is possible to provide a protective film structure avoiding degradation of sensor performance to an electronic device equipped with an in-display ultrasonic fingerprint sensor. It is possible to improve the performance of an ultrasonic sensor by matching the acoustic impedance between respective layers in the protective film structure configured as a plurality of layers.

According to various embodiments disclosed in this document, it is possible to provide an electronic device equipped with an in-display ultrasonic fingerprint sensor and including a protective film structure without deterioration in sensor performance.

DETAILED DESCRIPTION

Figure 1:
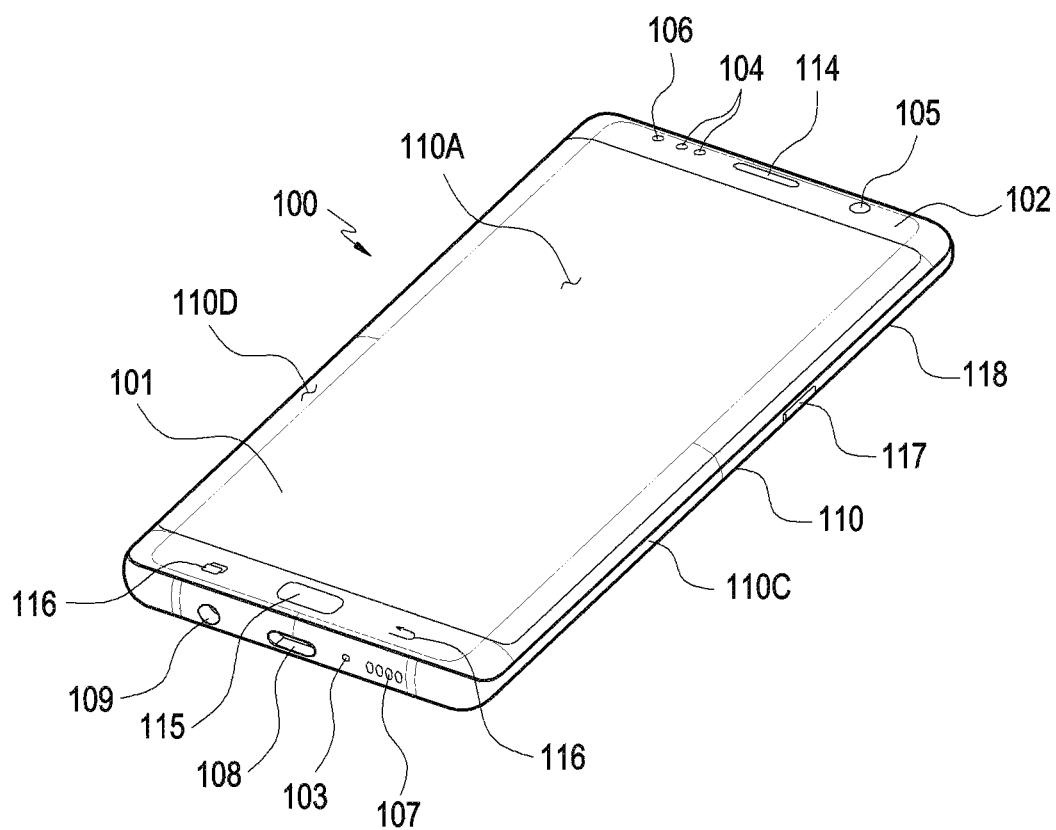
FIG. 1 is a perspective view illustrating the front side of a mobile electronic device according to a certain embodiment.

The embodiments which will be described below are provided in order to help those skilled in the art to easily understand the technical idea of the disclosure, and the disclosure is not limited thereto. Further, the matters represented in the accompanying drawings are schematically illustrated in order to easily explain embodiments of the disclosure, and may be different from actually implemented forms.

Before describing various embodiments of the disclosure in detail, it will be appreciated that application thereof is not limited to the details of configurations and arrangements of elements described in the following detailed description or illustrated in the drawings.

In addition, in the case where a certain element is described as being connected or coupled to another element, although the element may be directly connected or coupled to the corresponding element, it should be understood that another element may be interposed therebetween.

In addition, "connection" herein may include direct connection or indirect connection between one member and another member, and may indicate all physical connections and electrical connections such as adhesion, attachment, fastening, bonding, and coupling.

The terms used in the disclosure are merely used to describe specific embodiments, and are not intended to limit the disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described in detail with reference to the accompanying drawings.

Figure 2:
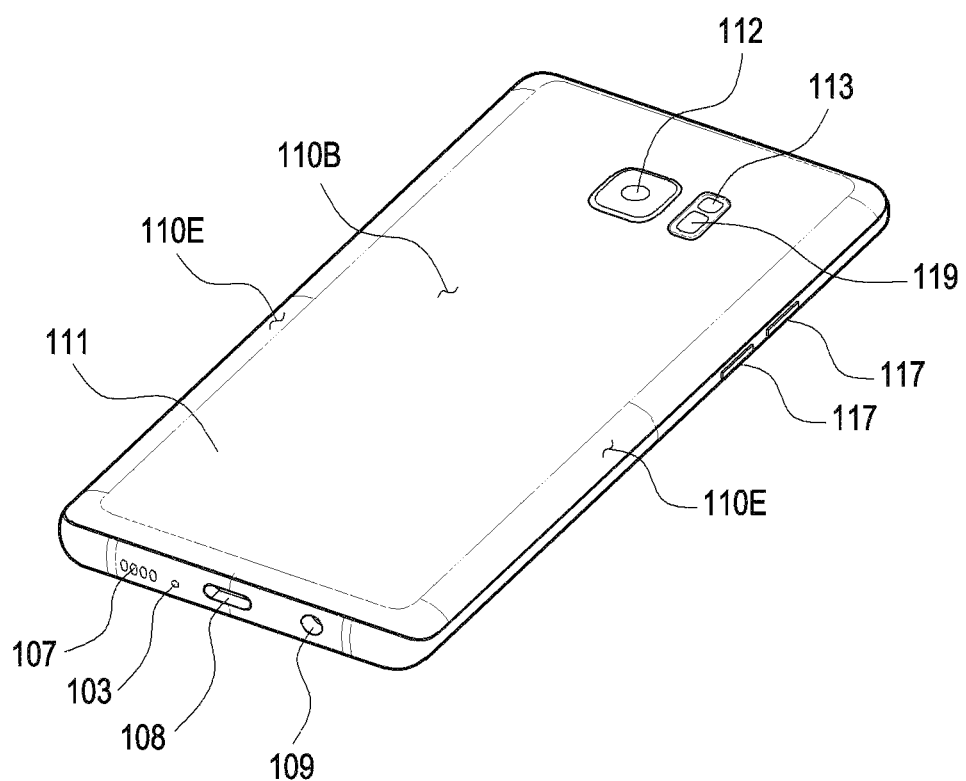
FIG. 2 is a perspective view illustrating the rear side of the electronic device shown in FIG. 1.
Figure 3:
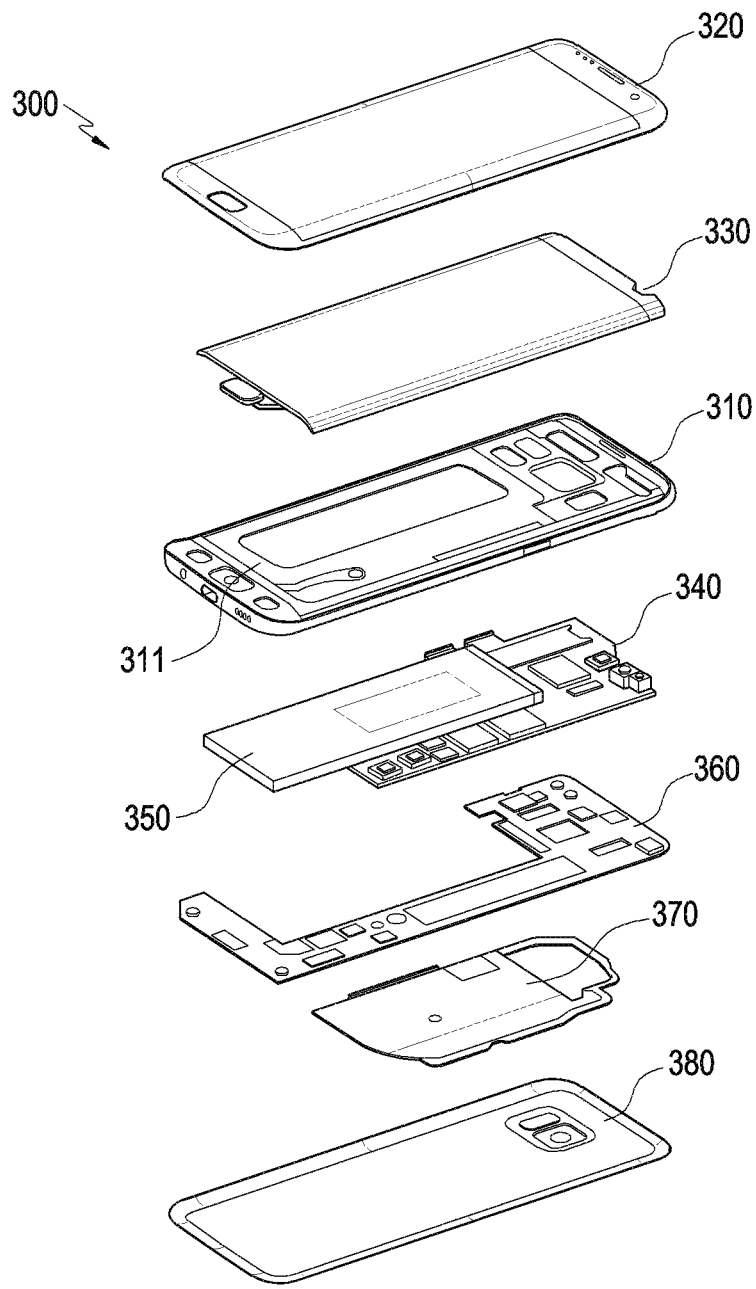
FIG. 3 is an exploded perspective view of the electronic device shown in FIG. 1.

FIG. 1 is a perspective view illustrating the front side of a mobile electronic device 100 according to an embodiment. FIG. 2 is a perspective view illustrating the rear side of the electronic device 100 shown in FIG. 1. FIG. 3 is an exploded perspective view of the electronic device shown in FIG. 1.

Referring to FIGS. 1 and 2, an electronic device 100 according to an embodiment may include a housing 110 that includes a first surface (or front surface) 110A, a second surface (or rear surface) 110B, and a side surface 110C surrounding the space between the first surface 110A and the second surface 110B. In another embodiment (not shown), the housing may refer to the structure that forms a portion of the first surface 110A, the second surface 110B, and the side surface 110C in FIG. 1. According to an embodiment, the first surface 110A may be formed by a front plate 102 that is at least partially transparent (e.g., a glass plate or a polymer plate including various coating layers). The second surface 110B may be formed by a rear plate 111 that is substantially opaque. The rear plate 111 may be formed of, for example, coated or colored glass, ceramic, polymer, metal (e.g., aluminum, stainless steel (STS), or magnesium), or a combination of at least two thereof. The side surface 110C may be connected to the front plate 102 and the rear plate 111, and may be formed by a side bezel structure (or "side surface member") 118 including a metal and/or a polymer. In a certain embodiment, the rear plate 111 and the side bezel structure 118 may be integrally formed with each other, and may include the same material (e.g., a metal material such as aluminum).

In the illustrated embodiment, the front plate 102 may include two first regions 110D at both ends of the long edge of the front plate 102, which is curved toward the rear plate 111 from the first surface 110A and extends seamlessly. In the illustrated embodiment (see FIG. 2), the rear plate 111 may include two second regions 110E at both ends of the long edge thereof, which is curved toward the front plate 102 from the second surface 110B and extends seamlessly. In a certain embodiment, the front plate 102 (or the rear plate 111) may include only one of the first regions 110D (or the second regions 110E). In another embodiment, some of the first regions 110D or the second regions 110E may not be included. In the above embodiments, when viewed from the side surfaces of the electronic device 100, the side bezel structure 118 may have a first thickness (or width) on the side surface that does not include the first regions 110D or the second regions 110E, and may have a second thickness, which is less than the first thickness, on the side surface that includes the first regions 110D or the second regions 110E.

According to an embodiment, the electronic device 100 may include at least one or more of a display 101, audio modules 103, 107, and 114, sensor modules 104 and 119, camera modules 105, 112, and 113, key input devices 115, 116, and 117, an indicator 106, and connector holes 108 and 109. In a certain embodiment, the electronic device 100 may exclude at least one of the elements (e.g., the key input devices 115, 116, and 117 or the indicator 106), or may further include other elements.

The display 101 may be exposed through, for example, most of the area of the front plate 102. In a certain embodiment, at least a portion of the display 101 may be exposed through the front plate 102 forming the first surface 110A and the first regions 110D of the side surface 110C. The display 101 may be connected to a touch detection circuit, a pressure sensor capable of measuring the intensity (pressure) of a touch, and/or a digitizer for detecting the magnetic-field type stylus, or may be disposed adjacent thereto. In a certain embodiment, at least some of the sensor modules 104 and 119 and/or at least some of the key input devices 115, 116, and 117 may be disposed in the first regions 110D and/or the second regions 110E.

The audio modules 103, 107, and 114 may include a microphone hole 103 and speaker holes 107 and 114. The microphone for obtaining external sound may be disposed in the microphone hole 103, and in a certain embodiment, a plurality of microphones may be provided in order to detect the direction of sound. The speaker holes 107 and 114 may include an external speaker hole 107 and a call receiver hole 114. In a certain embodiment, the speaker holes 107 and 114 and the microphone hole 103 may be implemented as one hole, or a speaker may be included without the speaker holes 107 and 114 (e.g., a piezo speaker).

The sensor modules 104 and 119 may produce electrical signals or data values corresponding to the internal operating state of the electronic device 100 or the external environmental state. The sensor modules 104 and 119, for example, may include a first sensor module 104 (e.g., a proximity sensor) and/or a second sensor module (not shown) (e.g., a fingerprint sensor) disposed on the first surface 110A of the housing 110, and/or a third sensor module 119 (e.g., an HRM sensor) disposed on the second surface 110B of the housing 110. The fingerprint sensor may be disposed on the second surface 110B of the housing 110, as well as the first surface 110A (e.g., a home key button 115). The electronic device 100 may further include at least one of sensor modules, which are not shown, such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera device 105 disposed on the first surface 110A of the electronic device 100, and a second camera device 112 disposed on the second surface 110B, and/or a flash 113. The camera devices 105 and 112 may include one or more lenses, an image sensor, and/or an image signal processor. The flash 113 may include, for example, a light emitting diode or a xenon lamp. In a certain embodiment, two or more lenses (an infrared camera, and wide-angle and telephoto lenses) and image sensors may be disposed on one side of the electronic device 100.

The key input devices 115, 116, and 117 may include a home key button 115 disposed on the first surface 110A of the housing 110, a touch pad 116 disposed around the home key button 115, and/or side key buttons 117 disposed on the side surface 110C of the housing 110. In another embodiment, the electronic device 100 may exclude some or all of the aforementioned key input devices 115, 116, and 117, and the excluded key input devices 115, 116, and 117 may be implemented in other forms such as soft keys or the like on the display 101.

The indicator 106 may be disposed on, for example, the first surface 110A of the housing 110. The indicator 106 may provide state information of the electronic device 100 in the form of, for example, light, and may include an LED.

The connector holes 108 and 109 may include a first connector hole 108 capable of accommodating a connector (e.g., a USB connector) for transmitting and receiving power and/or data to and from an external electronic device, and/or a second connector hole 109 (e.g., an earphone jack) capable of accommodating a connector for transmitting and receiving auto signals to and from an external electronic device.

Referring to FIG. 3, the electronic device 300 may include a side bezel structure 310, a first support member 311 (e.g., a bracket), a front plate 320, a display 330, a printed circuit board 340, a battery 350, a second support member 360 (e.g., a rear case), an antenna 370, and a rear plate 380. In a certain embodiment, the electronic device 300 may exclude at least one of the elements (e.g., the first support member 311 or the second support member 360), or may further include other elements. At least one of the elements of the electronic device 300 may be the same as or similar to at least one of the elements of the electronic device 100 in FIG. 1 or 2, and redundant descriptions thereof will be omitted below.

The first support member 311 may be disposed inside the electronic device 300, and may be connected to the side bezel structure 310, or may be integrally formed with the side bezel structure 310. The first support member 311 may be formed of, for example, a metal material and/or a non-metal material (e.g., polymer). The first support member 311 may have a display 330 coupled to one surface thereof and a printed circuit board 340 coupled to the opposite surface thereof. A processor, a memory, and/or an interface may be mounted on the printed circuit board 340. The processor, for example, may include one or more of a central processing unit, an application processor, a graphic processing unit, an image signal processor, a sensor hub processor, or a communication processor.

The memory may include, for example, volatile memory or non-volatile memory.

The interface may include, for example, a high definition multimedia interface (HDMI), a universal serial bus (USB) interface, an SD card interface, and/or an audio interface. The interface, for example, may electrically or physically connect the electronic device 300 to an external electronic device, and may include a USB connector, an SD card/MMC connector, or an audio connector.

The battery 350 is a device for supplying power to at least one element of the electronic device 300, and may include, for example, a non-rechargeable primary cell, a rechargeable secondary cell, or a fuel cell. At least a portion of the battery 350, for example, may be disposed substantially on the same plane as the printed circuit board 340. The battery 350 may be integrally disposed in the electronic device 300, or may be disposed detachably from the electronic device 300.

The antenna 370 may be disposed between the rear plate 380 and the battery 350. The antenna 370 may include, for example, a near-field communication (NFC) antenna, a wireless charging antenna, and/or a magnetic secure transmission (MST) antenna. The antenna 370, for example, may perform short-range communication with an external device, or may wirelessly transmit and receive power required for charging. In another embodiment, the antenna structure may be configured using a part of the side bezel structure 310 and/or the first support member 311 or a combination thereof.

Figure 4:
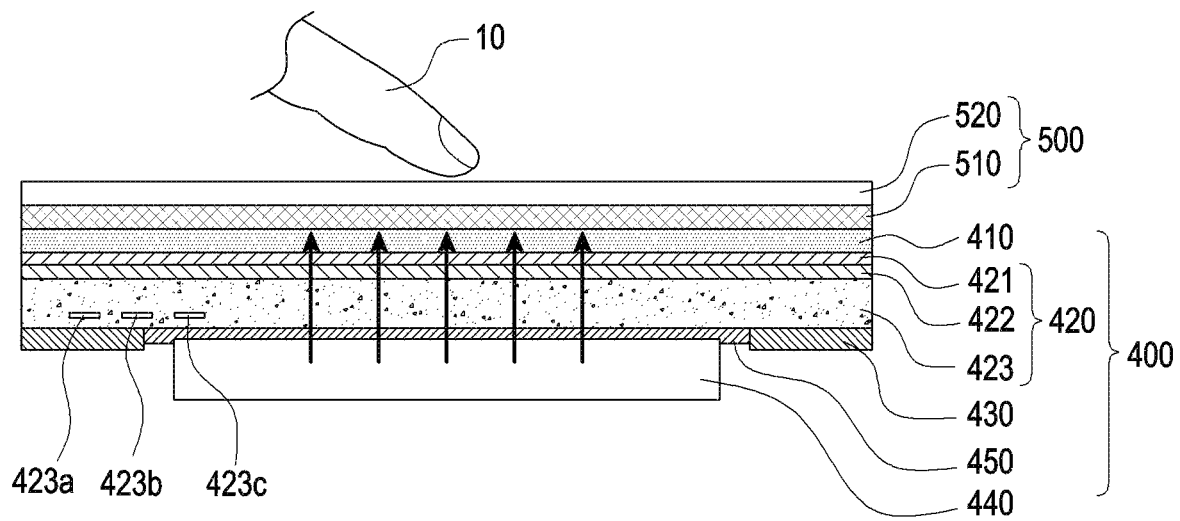
FIG. 4 is a diagram illustrating a cross-section of an electronic device and a protective film attached to the electronic device according to an embodiment disclosed in this document.

FIG. 4 is a diagram illustrating a cross-section of an electronic device 400 (e.g., 100 in FIG. 1) and a protective film 500 attached to the electronic device according to an embodiment disclosed in this document.

In FIG. 4, some configurations of the electronic device 400 (e.g., 100 in FIG. 1) may be schematically illustrated.

The electronic device 400 may include a front plate 410 (e.g., the front plate 320 in FIG. 3) that is at least partially transparent (e.g., a glass plate or a polymer plate including cover glass and various coating layers), a display 420, and a back panel 430. For reference, the display 420 and the back panel 430 shown in FIG. 4 may correspond to the display 330 in FIG. 3 (or the display 101 in FIG. 1). Although a printed circuit board, a bracket, a rear cover, and the like may be further provided under the back panel 430 of the electronic device 400, the above elements may be omitted in the various embodiments disclosed in this document, and the primary configuration thereof may be described in detail.

According to various embodiments, the front plate 410 may serve to protect the electronic device 400 from external impact. The front plate 410 may include a glass material, a polymer material, and the like.

According to various embodiments, the electronic device 400 may correspond to an electronic device equipped with a touch screen display. Accordingly, the display 420 may include elements of a touch screen display, such as a transparent adhesion layer (optical clear adhesive (OCA)) 421, a polarizer (POL) 422, and a display panel 423.

The display panel 423 may be, for example, an OCTA (on-chip touch AMOLED) panel, and may further a touch sensor capable of measuring the pressure of an external object and determining whether or not a touch is made. The display panel 423 may include a plurality of pixels 423a, 423b, and 423c arranged in the matrix form.

The plurality of pixels 423a, 423b, and 423c arranged on the display panel 423 may emit specified light (e.g., visible light and/or infrared light) under the control of a processor or display driver integrated (DDI) chip for executing software, thereby controlling various elements in the electronic device 400, and processing a variety of data or performing operations. The light emitted from the plurality of pixels 423a, 423b, and 423c may pass through the display 420 and the front plate 410.

According to various embodiments, the back panel 430 may include at least one of a cushion layer (or emboss layer) for protecting the panel from external impact, an adhesion layer, and a heat dissipation layer. In addition, the back panel 430 may include at least one or more conductive sheets (e.g., a Cu sheet) for shielding electromagnetic noise and preventing thermal diffusion. An ultrasonic fingerprint recognition sensor 440, which will be described later, may be disposed in the back panel 430 through a sensor mounting area (e.g., an opening).

According to an embodiment disclosed in this document, the electronic device may be an electronic device equipped with an ultrasonic fingerprint recognition sensor 440 (e.g., the sensor modules 104 and 119 in FIG. 1). According to an embodiment, the ultrasonic fingerprint recognition sensor 440 may be disposed to face the first surface (e.g., 110A in FIG. 1). According to an embodiment, the ultrasonic fingerprint recognition sensor 440 may be disposed under the display 410.

Referring to FIG. 4, an adhesion layer 450 may be interposed between the display 420 and the ultrasonic fingerprint recognition sensor 440. Here, the adhesion layer 450 may include, for example, a resin (e.g., a black resin), a transparent adhesion layer (optical clear adhesive (OCA)) (or a bonding film), and the like.

According to the embodiment shown in FIG. 4, although the ultrasonic fingerprint recognition sensor 440 is illustrated to be disposed under the adhesion layer 450, the adhesion layer 450, as a microstructure, may be omitted, and the display 420 and the ultrasonic fingerprint recognition sensor 440 may be configured such that there is no air gap therebetween.

The ultrasonic fingerprint recognition sensor 440 may transmit ultrasonic waves of a specified frequency toward the first surface (e.g., 110A in FIG. 1), and may collect at least some of the ultrasonic waves reflected by an external object 10 (e.g., the user's finger).

Since the ultrasonic fingerprint recognition sensor 440 disclosed in this document has a higher transmittance than, for example, the optical fingerprint recognition sensor, the effect according to passing through the display 420 described above may be less than that of the optical fingerprint recognition sensor. Therefore, interior design thereof may have more flexibility.

The configuration of the protective film 500 may be shown in FIG. 4.

The protective film 500 disclosed in this document may be an optical protective film, and may be an protective film used for the purposes of anti-glare, anti-reflection, and the like, as well as for protecting the surface of the electronic device (e.g., 400). According to an embodiment, the protective film 500 may perform a polarization function. According to another embodiment, the protective film 500 may serve to prevent the penetration of oxygen and water from the outside.

According to an embodiment, the protective film 500 may include a first adhesion layer 510 and a first substrate layer 520. The surface protection function of the protective film 500 for the electronic device 400 may be performed by the first substrate layer 520 that is a substrate layer, and it may be attached to the electronic device 400 through the first adhesive layer 510 formed on one surface of the first substrate layer 520 of the protective film 500. The protective film 500 may be attached to the front plate 410 in the state in which the first adhesive layer 510 is stacked on the first substrate layer 520. For reference, in this document, "adhesion" may include various other expressions indicating the state in which an element is connected to another element, such as "bonding", "attachment", "placement", or the like.

According to various embodiments, the first substrate layer 520 may be made so as to include at least one of transparent polymer resins such as a polyethylene terephthalate (PET) resin, a polypropylene resin a polyolefin resin, a polyester resin, a polyacrylic resin, a polycarbonate resin, or the like. According to an embodiment, the polyethylene terephthalate (PET) with high transparency, good mechanical strength, excellent workability, and strong durability may be used as a material for the first substrate layer 520. In this case, the first substrate layer 520 may have a transparent and smooth surface.

According to various embodiments, the first adhesive layer 510 may be attached to the front plate 410, and may have adhesiveness so as to be peeled off from the front plate 410 as necessary. According to an embodiment, the first adhesive layer 510 may be made of a material having excellent re-adhesion, such as a silicone-based pressure-sensitive adhesive (PSA), a silicone-based adhesive, an acrylic adhesive, an urethane-based adhesive, and the like. A material, which prevents the first adhesive layer 510 from being separated from the first substrate layer 520 when the protective film 500 is peeled off, enables re-adhesion to the front plate 410, and prevents damage to the surface (e.g., the first surface 110A in FIG. 1) of the front plate 410 when the protective film 500 is peeled off, may be used for the first adhesive layer 510.

Figure 5A:
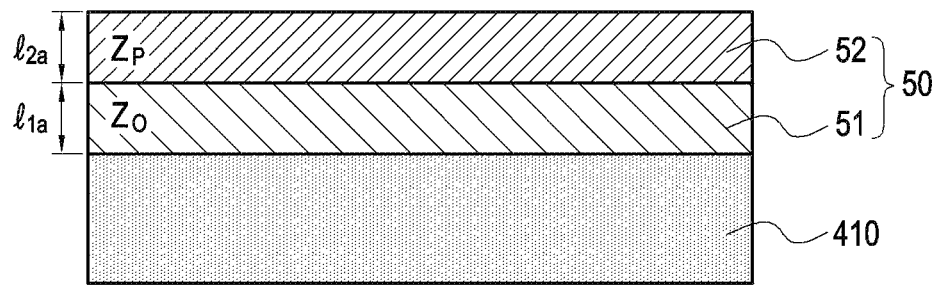
FIG. 5A is a diagram illustrating a protective film attached to a front plate according to a certain embodiment.
Figure 5B:
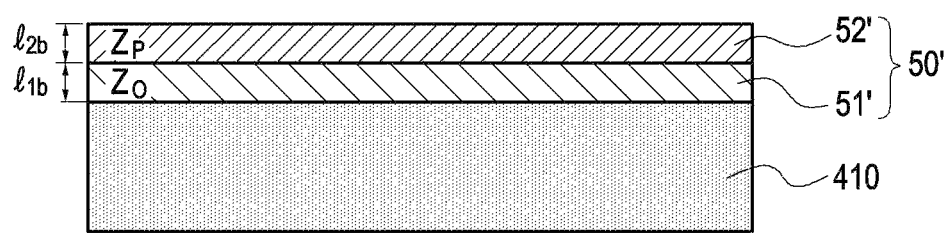
FIG. 5B is a diagram illustrating a protective film attached to a front plate and having a thickness less than that of the protective film disclosed in FIG. 5A.
Figure 5C:
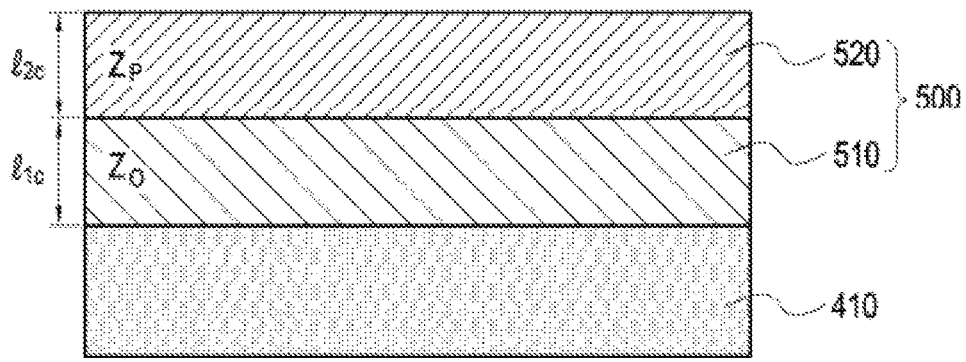
FIG. 5C is a diagram illustrating a protective film attached to a front plate according to an embodiment disclosed in this document.
Figure 5D:
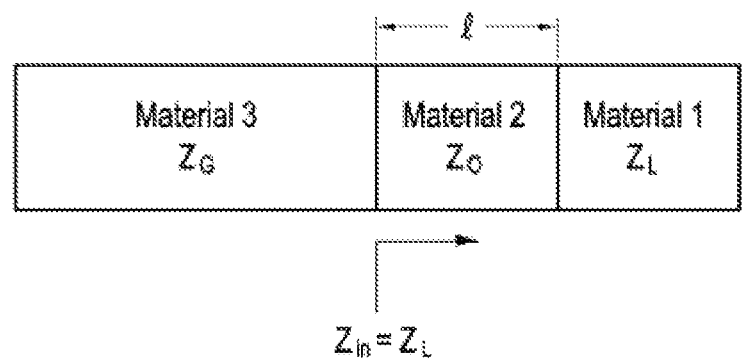
FIG. 5D is a diagram showing the concept of acoustic impedance matching.
Figure 5E:
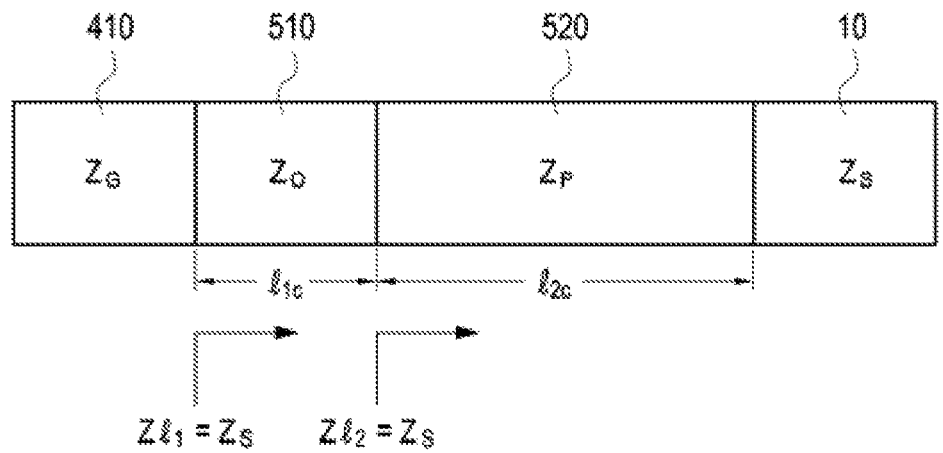
FIG. 5E is a diagram illustrating the embodiment shown in FIG. 5C, which is reconfigured in terms of acoustic impedance matching.

FIG. 5A is a diagram illustrating a protective film 50 attached to a front plate 410 (e.g., glass) according to a certain embodiment. FIG. 5B is a diagram illustrating a protective film 50' attached to a front plate 410 and having a thickness less than that of the protective film disclosed in FIG. 5A. FIG. 5C is a diagram illustrating a protective film 500 attached to a front plate 410 according to an embodiment disclosed in this document. FIG. 5D is a diagram illustrating the concept of acoustic impedance matching. FIG. 5E is a diagram illustrating the embodiment shown in FIG. 5C, which is reconfigured in terms of acoustic impedance matching.

Technical characteristics of a protective film according to various embodiments of this document may be described with reference to FIGS. 5A to 5E. Several adhesive layers 51, 51', and 510 and several substrate layers 52, 52', and 520 may be described in the following description. The adhesive layer according to various embodiments disclosed in this document may be referred to as a "first adhesive layer 510" in order to distinguish the same from the adhesive layer according to other embodiments. The substrate layer according to various embodiments of this document may be referred to as a "first substrate layer 520" in order to distinguish the same from the substrate layer according to other embodiments.

According to a certain embodiment shown in FIG. 5A, as a protective film 50 attached to the front plate 410, a protective film 50 including an adhesive layer 51 formed to have a thickness $l_{1a}$ and a substrate layer 52 formed to have a thickness $l_{2a}$ may be disclosed. If the protective film 50 is attached to the front plate 410 to which an ultrasonic fingerprint recognition sensor (e.g., 440 in FIG. 4) is mounted, the fingerprint recognition rate may be lowered because the adhesive layer 51 and the protective film 50 are thick. According to a certain embodiment, the thickness of the adhesive layer 51 may be generally configured as 20 to 30 μm, and the thickness of the substrate layer 52 may be generally configured as 40 to 60 μm.

Degradation in the performance of the ultrasonic fingerprint recognition sensor may be attributable to acoustic impedance mismatching between the protective film 50 and the front plate 410. In order to match the acoustic impedance, there is provided a method of adjusting the density and modulus of the material constituting the protective film 50, but this method requires change in the physical property of the material or the type of the material, so it has limitation as to matching of the acoustic impedance.

According to a certain embodiment shown in FIG. 5B, as a protective film 50 attached to the front plate 410, a protective film 50' including an adhesive layer 51' formed to have a thickness $l_{1b}$ and a substrate layer 52' formed to have a thickness $l_{2b}$ may be disclosed. Here, the thickness $l_{1b}$ of the adhesive layer 51' may be less than the thickness $l_{1a}$ of the adhesive layer 51 shown in FIG. 5A, and the thickness $l_{2b}$ of the substrate layer 52' may be less than the thickness $l_{2a}$ of the substrate layer 52 shown in FIG. 5A. That is, the embodiment shown in FIG. 5B may show that the thickness of the adhesive layer 51' and the thickness of the substrate layer 52' are intentionally formed to be thin in order to increase the fingerprint recognition rate. According to the embodiment in FIG. 5B, by forming the stacked protective film 50' to be thin, it is possible to reduce the area where sound waves are reflected. For example, the adhesive layer 51' may have a thickness of 5 to 10 µm, and the substrate layer 52' may have a thickness of 20 to 30 µm.

However, as in the embodiment shown in FIG. 5B, if the adhesive layer 51, which is generally formed to have a thickness of 20 to 30 µm, is formed to be thin so as to have a thickness of 5 to 10 µm, the adhesive layer 51 may have significantly lower adhesion than required value, thereby causing separation in the front plate having a curved surface. In addition, if the substrate layer 52, which is generally formed to have a thickness of 40 to 60 µm, is formed to be thin so as to have a thickness of 20 to 30 µm, the function of protecting the display against scratch may deteriorate. In other words, it may not be easy to increase the fingerprint recognition rate while maintaining the inherent performance of the protective film only by making the protective film thin.

FIG. 5C relates to a protective film 500 attached to the front plate 410 according to various embodiments disclosed in this document, and may disclose a protective film 500 including a first adhesive layer 510 formed to have a thickness $l_{1c}$ and a first substrate layer 520 formed to have a thickness $l_{2c}$. According to an embodiment disclosed in this document, the thickness $l_{1c}$ of the first adhesive layer 510 may be greater than the thickness $l_{1a}$ of the adhesive layer 51 shown in FIG. 5A. Separately or alternatively, the thickness $l_{2c}$ of the first substrate layer 520 according to an embodiment may be greater than the thickness $t_{2a}$ of the substrate layer 52 shown in FIG. 5A. For example, the first adhesive layer 510 may have a thickness of 35 to 50 µm, and the first substrate layer 520 may have a thickness of 60 to 100 µm. That is, in the embodiment shown in FIG. 5C, a protective film 500 having a greater thickness than the generally used protective film 50 may be disclosed. Nevertheless, the protective film 500 according to various embodiments disclosed in this document may not degrade the fingerprint recognition rate of an ultrasonic fingerprint sensor, compared to the generally used protective film 50.

According to various embodiments disclosed in this document, even if at least one of the first adhesive layer 510 and the first substrate layer 520 constituting the protective film 500 is made to be thicker than the conventional one, the fingerprint recognition rate of the ultrasonic fingerprint sensor may not be lowered. There is an advantage of strengthening the adhesion or improving protective performance (e.g., scratch resistance) by maintaining at least one of the first adhesive layer 510 and the first substrate layer 520 to be thick without degrading the fingerprint recognition rate of the ultrasonic fingerprint sensor.

To this end, according to various embodiments disclosed in this document, in consideration of an operating frequency (f) of an ultrasonic fingerprint recognition sensor (e.g., 440 in FIG. 4) mounted to an electronic device (e.g., 400 in FIG. 4) and a wavelength (λ) corresponding thereto, at least one of the first adhesive layer 510 and the first substrate layer 520 may be formed to have a thickness of ½ times the wavelength (λ) corresponding to the operating frequency (f). In other words, at least one of the first adhesive layer 510 and the first substrate layer 520 may be formed to have a thickness of ½nλ with respect to the wavelength (λ) of an ultrasonic wave emitted from the ultrasonic fingerprint recognition sensor. Here, n is an integer where n>0. For example, at least one of the first adhesive layer 510 and the first substrate layer 520 may have a thickness of ½ times, 1 times, 3/2 times, 2 times, 5/2 times . . . , or n/2 times the ultrasonic wavelength (λ). Hereinafter, an embodiment in which the thickness is ½ times the ultrasonic wavelength (λ) may be described by way of example.

According to an embodiment, in the case where the operating frequency of the ultrasonic fingerprint recognition sensor (e.g., 440 in FIG. 4) is $f_1$ and the wavelength corresponding thereto is $\lambda_1$, the first adhesive layer 510 constituting the protective film 500 may be formed to have a thickness of ½ $\lambda_1$. According to another embodiment, in the case where the operating frequency of the ultrasonic sensor (e.g., 440 in FIG. 4) is $f_2$ and the wavelength corresponding thereto is $\lambda_2$, the first substrate layer 520 constituting the protective film 500 may be formed to have a thickness of ½ $\lambda_2$. According to another embodiment, in the case where the operating frequency of the ultrasonic sensor (for example, 440 in FIG. 4) is $f_3$ and the wavelength corresponding thereto is $\lambda_3$, the first adhesive layer 510 and the first substrate layer 520 constituting the protective film 500 may be formed to have a thickness of ½ $\lambda_3$. According to another embodiment, the first adhesive layer 510 may be formed as ½ of the operating frequency $\lambda_4$, and the thickness of the first substrate layer 520 may be formed to be $\lambda_4$ (or 3/2 times, 2 times, or 5/2 times, . . . ), respectively.

As described above, the thickness of at least one of the first adhesive layer 510 and the first substrate layer 520 may be adjusted in consideration of the operating frequency (f) of the ultrasonic sensor (e.g., 440 in FIG. 4) and the corresponding wavelength λ, thereby matching the acoustic impedance.

Referring to FIG. 5D, a diagram for explaining the concept of acoustic impedance matching is shown.

The principle of acoustic impedance matching may be based on the reflection coefficient formula described in the following Equation 1.

$$\Gamma_L = \frac{Z_L - Z_O}{Z_L + Z_O} \qquad \text{[Equation 1]}$$

Here, $Z_L$ may represent an impedance value of a second medium, and $Z_O$ may represent an impedance value of a first medium. Equation 1 may represent a reflection coefficient $\Gamma_L$ in the situation in which $Z_O$ and $Z_L$ are arranged parallel to each other according to the traveling direction of a sound wave.

In theory, as shown in the above equation, if the difference between impedance values is large, the reflection coefficient may increase.

According to the embodiment shown in FIG. 5D, reflection of a sound wave may occur between the first material $Z_L$, the second material $Z_O$, and the third material $Z_G$ having different impedances while the sound wave is travelling. The input impedance including the first material $Z_L$ in the second material $Z_O$ may be expressed as shown in Equation 2 below depending on the distance.

$$Z_{in} = Z_O \frac{1 + \Gamma_L e^{-2j\beta l}}{1 - \Gamma_L e^{-2j\beta l}} = Z_O \frac{Z_L + jZ_O \tan\beta l}{Z_O + jZ_L \tan\beta l} \qquad \text{[Equation 2]}$$

Here, l is the distance from the boundary surface of the first material $Z_L$ to another boundary surface of the second material $Z_O$, and β is expressed as β=2π/λ. If the distance t of the second material $Z_O$ is configured as a multiple of λ/2 of the operating frequency (f), the input impedance $Z_{in}$ between the second material $Z_O$ and the third material $Z_G$ is expressed as the impedance of the first material $Z_L$ regardless of the impedance of the second material $Z_O$, as shown in Equation 3 below, thereby providing an effect of removing the impedance of an intermediate material (e.g., the second material $Z_0$). In other words, in terms of matching of the acoustic impedance, there may be an effect in which no other material (e.g., the second material $Z_O$) exists between the third material $Z_G$ and the first material $Z_L$.

$$Z_{in}=Z_L \qquad \text{[Equation 3]}$$

Referring to FIG. 5E, the configurations of the protective film 500 and the front plate 410 according to the embodiment disclosed in FIG. 5C may be reconfigured in terms of acoustic impedance matching.

When the principle of impedance matching described above is applied to the embodiment disclosed in FIG. 5E in this document, the first adhesive layer 510 constituting the protective film 500 may be formed to have a thickness of λ/2 in consideration of the operating frequency (f) of the ultrasonic sensor (e.g., 440 in FIG. 4) and the ultrasonic wavelength (λ) corresponding thereto, thereby obtaining an effect of lowering the overall acoustic impedance of the protective film 500. In this process, even if the thickness of the first adhesive layer 510 becomes larger than the conventionally and widely used dimension, it is possible to obtain an effect of improving the fingerprint recognition rate. Additionally or alternatively, the overall acoustic impedance of the protective film 500 may be reduced by forming the first substrate layer 520 constituting the protective film 500 to have a thickness of λ/2. In this process, even if the thickness of the first substrate layer 520 becomes larger than the conventionally and widely used dimension, it is possible to obtain an effect of improving the fingerprint recognition rate.

For example, if the first adhesive layer 510 is formed to have a thickness of λ/2, and if the first substrate layer 520 is formed to have a thickness of λ/2, the overall acoustic impedance of the protective film 500 may be further lowered, and it is possible to obtain an effect of directly matching the impedance $Z_G$ of the front plate 410 to the impedance $Z_S$ of a biometric fingerprint.

As described above, the thickness of at least one of the first adhesive layer 510 and the first substrate layer 520 constituting the protective film 500 may be designed in consideration of the operating frequency (f) of the ultrasonic fingerprint recognition sensor (e.g., 440 in FIG. 4) and the ultrasonic wavelength (λ) corresponding thereto. According to this, even if at least one of the first adhesive layer 510 and the first substrate layer 520 becomes thick, it is possible to improve the fingerprint recognition rate of the ultrasonic fingerprint recognition sensor (e.g., 440 in FIG. 4) and to enhance the adhesion and/or protection functions (e.g., scratch resistance), which are inherent functions of the first adhesive layer 510 and the first substrate layer 520.

In the above-described embodiment, the operating frequency (f) of the ultrasonic fingerprint recognition sensor (e.g., 440 in FIG. 4) and the ultrasonic wavelength (λ) according thereto may be predetermined. The operating frequency (f) of the ultrasonic fingerprint recognition sensor (e.g., 440 in FIG. 4) and the ultrasonic wavelength (λ) according thereto may be variously configured, and accordingly, the thicknesses of the first adhesive layer 510 and the first substrate layer 520 may also be variously configured.

Figure 6:
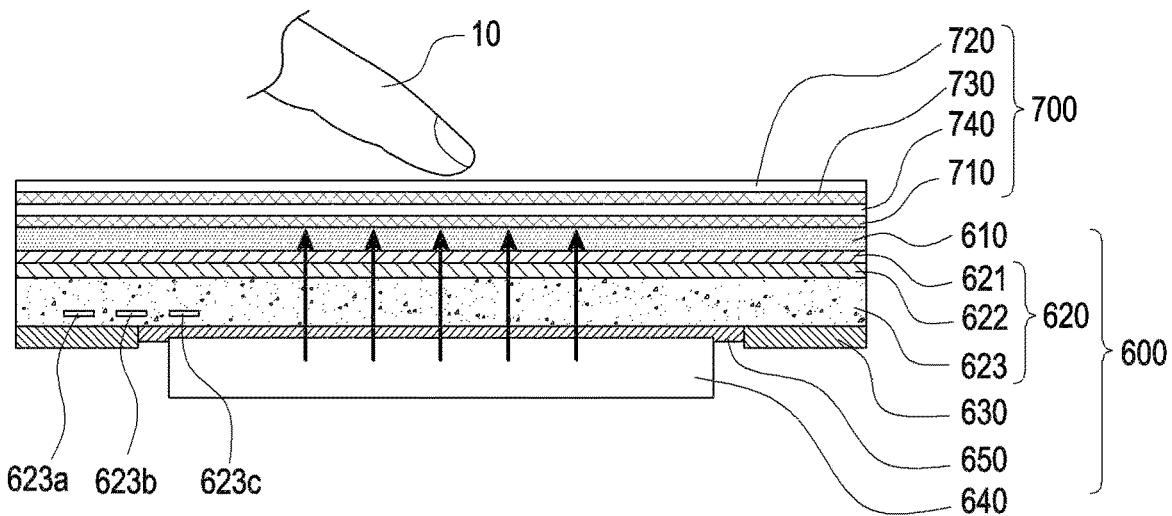
FIG. 6 is a diagram illustrating a cross-section of an electronic device and a protective film attached to the electronic device according to another embodiment disclosed in this document.

FIG. 6 is a diagram illustrating a cross-section of an electronic device 600 and a protective film 700 attached to the electronic device 600 according to another embodiment disclosed in this document.

Like FIG. 4, FIG. 6 may schematically illustrate a partial configuration of an electronic device 600 (e.g., 100 in FIG. 1).

The electronic device 600 may include a front plate 610 (e.g., the front plate 410 in FIG. 4) that is at least partially transparent, a display 620 (e.g., the display 420 in FIG. 4), and a back panel 630 (e.g., the back panel 430 in FIG. 4).

The configuration of the electronic device 600 shown in FIG. 6 may be similar to that of the electronic device 400 shown in FIG. 4, and functions thereof may also be similar to the same. Therefore, in describing the embodiment of the electronic device 600 in FIG. 6, the description that has been made in the embodiment in FIG. 4 may be omitted below.

Like FIG. 4, FIG. 6 may illustrate the configuration of a protective film 700. In describing the embodiment of the protective film 700 in FIG. 6, the description that has been made in the embodiment in FIG. 4 may be omitted below.

According to an embodiment, the protective film 700 may include a first adhesive layer 710 (e.g., the first adhesive layer 510 in FIG. 4) and a first substrate layer 720 (e.g., the first substrate layer 520 in FIG. 4), a second adhesive layer 730, and a second substrate layer 740. The surface protection function of the protective film 700 for the electronic device 600 may be performed by the first substrate layer 720 or the second substrate layer 740, which is a substrate layer.

Figure 7A:
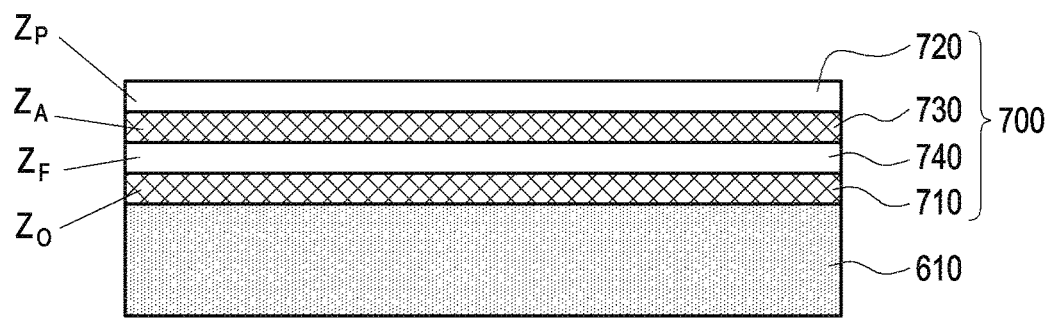
FIG. 7A is a diagram illustrates a protective film attached to a front plate according to another embodiment disclosed in this document.

Referring to the layered structure of the protective film 700 shown in FIG. 7A, the protective film 700 may include: a first adhesive layer 710 attached onto the front plate 610 of the electronic device (e.g., 600 in FIG. 6); a second substrate layer 740 stacked on top of the first adhesive layer 710; a second adhesive layer 730 stacked on top of the second substrate layer 740; and a first substrate layer 720 stacked on top of the second adhesive layer 730. The first adhesive layer 710, the second substrate layer 740, the second adhesive layer 730, and the first substrate layer 720 may be stacked in sequence.

The first substrate layer 720 (e.g., the first substrate layer 520 in FIG. 4) and the second substrate layer 740 may be made of a transparent polymer resin such as a polyethylene terephthalate (PET) resin, a polypropylene resin, a polyolefin resin, a polyester resin, a polyacrylic resin, a polycarbonate resin, or the like. The first substrate layer 720 and the second substrate layer 740 may have transparent and smooth surfaces.

According to an embodiment, the second substrate layer 740 may be formed of a softer material than the first substrate layer 720. Accordingly, even if the total thickness of the protective film 700 becomes slightly larger by stacking four layers in FIG. 7, the protective film 700 may be flexibly bent along the curved surface of the electronic device (e.g. 600 in FIG. 6).

The first adhesive layer 710 (e.g., the first adhesive layer 510 in FIG. 4) may be attached to the front plate 420, and may have adhesiveness so as to be peeled off from the front plate 420 as necessary. According to an embodiment, the first adhesive layer 710 may be made of a material having excellent re-adhesion, such as a silicone-based pressure-sensitive adhesive (PSA), a silicone-based adhesive, an acrylic adhesive, an urethane-based adhesive, and the like. One side of the second adhesive layer 730 may be bonded to the first substrate layer 720, and the opposite side thereof may be bonded to the second substrate layer 740. The second adhesive layer 730 may have strong adhesiveness so as not to be separated from the first substrate layer 720 and the second substrate layer 740 even in the case where the first adhesive layer 710 is peeled off from the front plate 610. According to an embodiment, the second adhesive layer 730 may be formed of a material including at least one of an optical clear adhesive (OCA), a silicone-based adhesive, an acrylic adhesive, and an urethane-based adhesive.

Figure 7B:
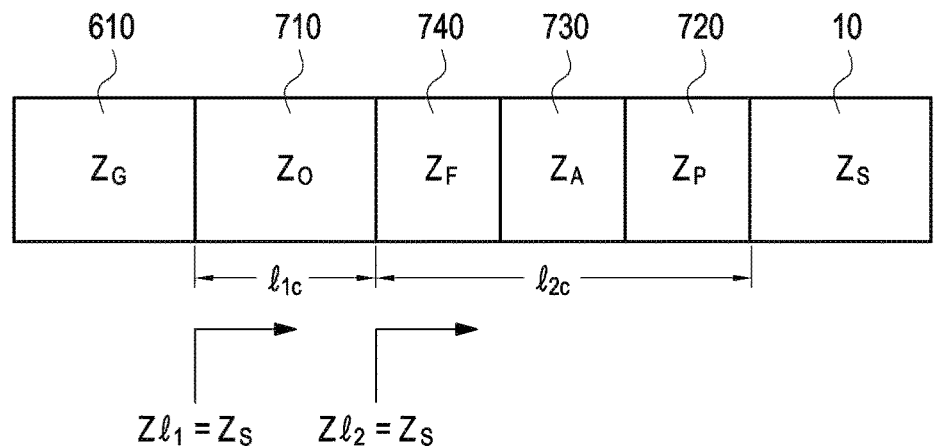
FIG. 7B is a diagram illustrating the embodiment shown in FIG. 7A, which is reconfigured in terms of acoustic impedance matching.

FIG. 7A is a diagram showing a protective film 700 attached to a front plate according to another embodiment disclosed in this document. FIG. 7B is a diagram illustrating the embodiment shown in FIG. 7A, which is reconfigured in terms of acoustic impedance matching.

When the principle of impedance matching is applied to the embodiment disclosed in FIG. 7B in this document, the first adhesive layer 710 constituting the protective film 700 may be formed to have a thickness of $\lambda/2$ in consideration of the operating frequency (f) of the ultrasonic sensor (e.g., 440 in FIG. 4) and the ultrasonic wavelength ($\lambda$) corresponding thereto, thereby obtaining an effect of lowering the overall acoustic impedance of the protective film 700. In this process, even if the thickness of the first adhesive layer 710 becomes larger than the conventionally and widely used dimension, it is possible to obtain an effect of improving the fingerprint recognition rate. Additionally or alternatively, the overall acoustic impedance of the protective film 700 may be reduced by forming the first substrate layer 720 constituting the protective film 700 to have a thickness of $\lambda/2$. In this process, even if the thickness of the first substrate layer 720 becomes larger than the conventionally and widely used dimension, it is possible to obtain an effect of improving the fingerprint recognition rate. In addition, it is possible to obtain an effect of reducing the overall acoustic impedance of the protective film 700 by forming at least one of the second substrate layer 740 and the second adhesive layer 730 to have a thickness of $\lambda/2$ as well.

According to various embodiments, the impedance of each of the second adhesive layer 730 and the impedance of the second substrate layer 740 may be configured such that a difference between the same and the impedance of the first substrate layer 720 is equal to or less than a predetermined value. For example, if the impedance of the first substrate layer 720 is 3 MRayl under the condition of an error range of 0.1 MRayl, the impedance of the second adhesive layer 730 may be 2.95 MRayl, and the impedance of the second substrate layer 740 may be 3.04 MRayl. As described above, in a multi-layered (e.g., four-layered) structure, it is possible to minimize reflection of sound waves between layers by configuring the impedances of at least two or more layers within the same or a similar range.

According to various embodiments, the first substrate layer 720, the second adhesive layer 730, and the second substrate layer 740 may be configured such that the sum of the thicknesses thereof is $\frac{1}{2}n\lambda$. For example, if the sum of the thicknesses of the first substrate layer 720, the second adhesive layer 730, and the second substrate layer 740 is $\lambda/2$ in the state in which the thickness of the first adhesive layer 710 is $\lambda/2$, the overall acoustic impedance of the protective film 700 may be further lowered, thereby obtaining an effect of directly matching the impedance $Z_G$ of the front plate 610 to the impedance $Z_s$ of the biometric fingerprint. In particular, in the embodiment shown in FIGS. 7A and 7B, the sum of the thicknesses of the first substrate layer 720, the second adhesive layer 730, and the second substrate layer 740 may be configured as $\frac{1}{2}n\lambda$. This may be the same as the thickness of the first substrate layer 520 in the embodiment shown in FIG. 4. That is, the total thickness of the protective film 700 shown in FIGS. 7A and 7B may be the same as the total thickness of the protective film 500 shown in FIG. 4. Accordingly, even if the protective film 700 has a four-layered structure, the same effect as a two-layered structure may be obtained, and ultrasonic sensor performance may be secured while minimizing the total thickness of the film.

As described above, the thickness of at least one of the first adhesive layer 710, the first substrate layer 720, the second adhesive layer 730, and the second substrate layer 740 constituting the protective film 700 may be designed in consideration of the operating frequency (f) of the ultrasonic fingerprint recognition sensor (e.g., 640 in FIG. 6) and the ultrasonic wavelength ($\lambda$) according thereto. According to this, even if at least one of the first adhesive layer 710, the first substrate layer 720, the second adhesive layer 730, and the second substrate layer 740 becomes thick, the fingerprint recognition rate of the ultrasonic fingerprint recognition sensor (e.g., 640 in FIG. 6) may be improved.

A protective film (e.g., 500 in FIG. 4 or 700 in FIG. 6) according to various embodiments may be integrated to and used in an electronic device (e.g., 400 in FIG. 4 or 600 in FIG. 6). In this case, the protective film may be formed so as not to be peeled off from the front plate (e.g., 420 in FIG. 4 or 610 in FIG. 6) of the electronic device (e.g., 400 in FIG. 4 or 600 in FIG. 6).

Figure 8:
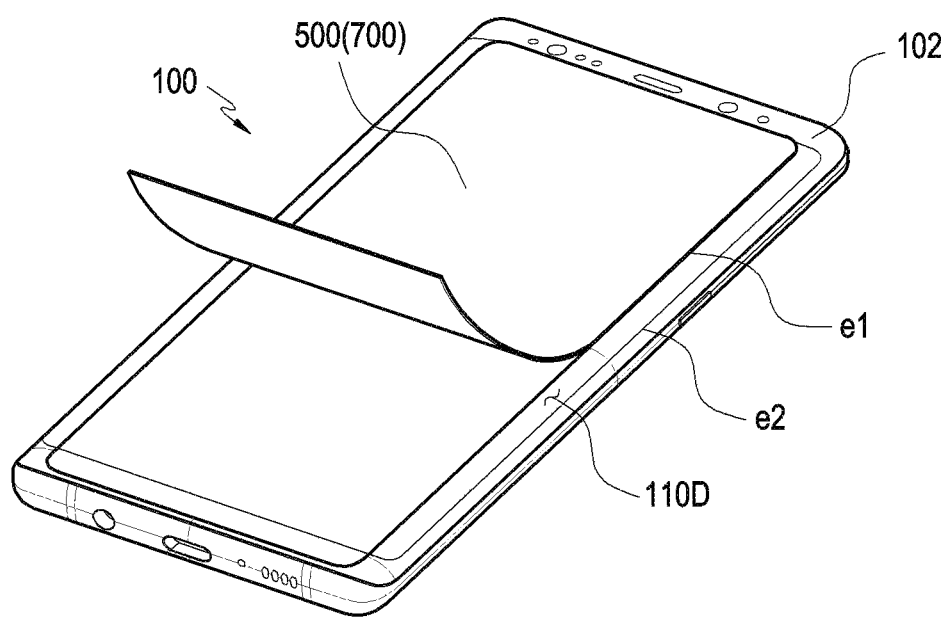
FIG. 8 is a diagram illustrating a process in which a protective film is attached to a flat surface of an electronic device according to various embodiments disclosed in this document.
Figure 9:
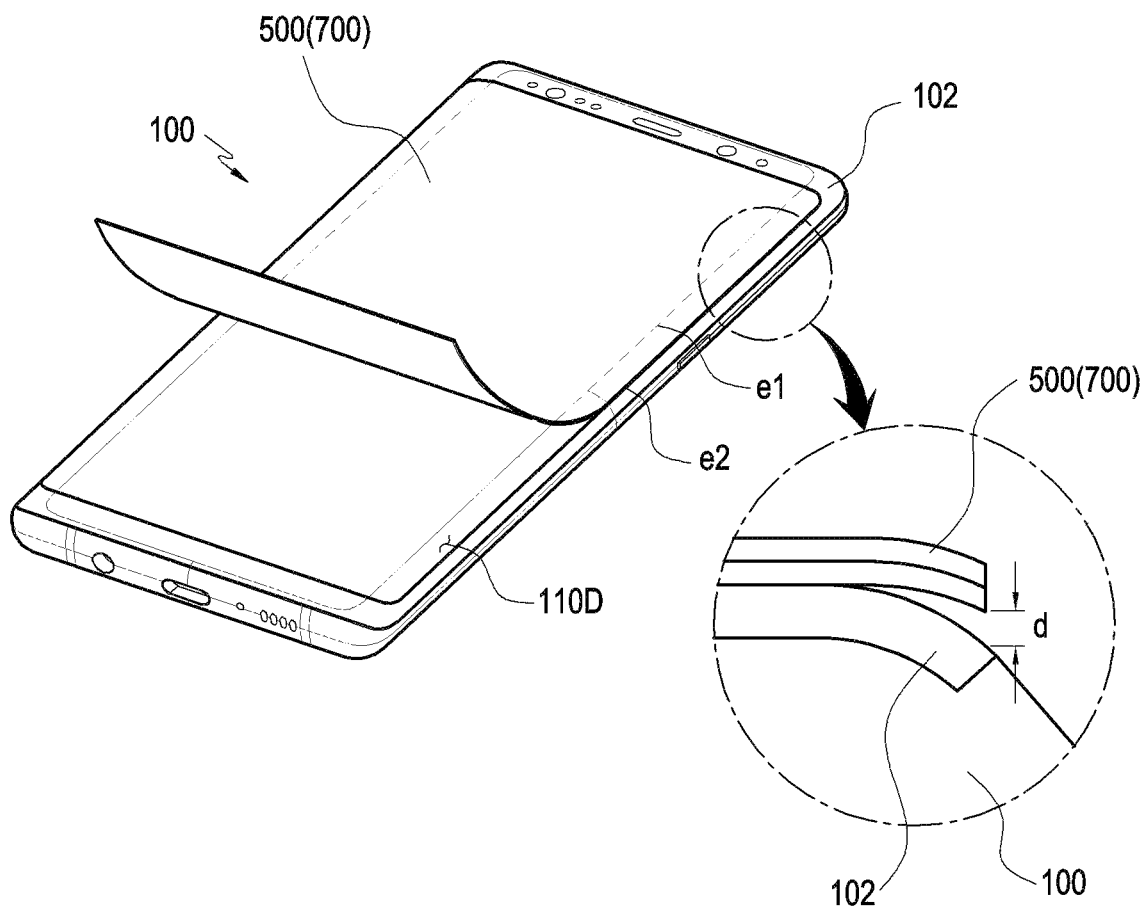
FIG. 9 is a diagram illustrating a process in which a protective film is attached to a flat surface and a curved surface of an electronic device according to a different embodiment from that in FIG. 8.

FIG. 8 is a diagram illustrating a process in which a protective film 500 or 700 is attached to a flat surface of an electronic device 100 according to various embodiments disclosed in this document. FIG. 9 is a diagram illustrating a process in which a protective film 500 or 700 is attached to a flat surface and a curved surface of an electronic device 100 according to a different embodiment from that in FIG. 8

According to an embodiment, the electronic device 100 of the disclosure may be an electronic device equipped with a home key 115 as shown in FIG. 1, or may be an electronic device that is not equipped with a home key 115 as shown in FIGS. 8 and 9. The protective film 500 or 700 in this document may be attached to various positions on the surface of the front plate 102 of the electronic device.

Referring to FIG. 8, the protective film 500 or 700 may be attached to the surface of the front plate 102 of the electronic device 100 so as to extend to the line e1 that does not include a curved region 110D. On the other hand, referring to FIG. 9, the protective film 500 or 700 may be attached to the surface of the front plate 102 of the electronic device 100 so as to extend to the line e2 including the curved region 110D. In the case of attaching a typical protective film to an electronic device, as shown in FIG. 9, the gap between the protective film and the electronic device 100 may be widened, but in the case of using the protective film 500 or 700 disclosed in this document, since the protective film 500 or 700 may not be made thin, the inherent adhesiveness and protective performance (e.g., scratch resistance) of the protective film is able to be maintained. Further, the protective film 500 or 700 may be formed to be thicker than the typical protective film, thereby attaining improved adhesion and improved protective performance (e.g., scratch resistance) without deterioration of the performance of the fingerprint recognition sensor.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

According to various embodiments disclosed in this document, it is possible to provide a protective film (e.g., 500 in FIG. 4) configured to be attached to an electronic device (e.g., 400 in FIG. 4) equipped with an ultrasonic fingerprint recognition sensor (e.g., 440 in FIG. 4), which includes: a first adhesive layer (e.g., 510 in FIG. 4) configured to be attached to a front plate (e.g., 420 in FIG. 4) of the electronic device; and a first substrate layer (e.g., 520 in FIG. 4) stacked on the first adhesive layer and covering the front plate, wherein at least one of the first adhesive layer and the first substrate layer is formed to have a thickness of ½nλ with respect to the wavelength (λ) of an ultrasonic wave emitted from the ultrasonic fingerprint recognition sensor of the electronic device.

According to various embodiments, the first adhesive layer may be formed of a material including at least one of a pressure sensitive adhesive (PSA), a silicone-based adhesive, an acrylic adhesive, and an urethane-based adhesive.

According to various embodiments, the first substrate layer may be formed of a material including at least one of a polyethylene terephthalate (PET) resin, a polypropylene resin, a polyolefin resin, a polyester resin, a polyacrylic resin, and a polycarbonate resin.

According to various embodiments, the thickness of at least one of the first adhesive layer and the first substrate layer may be configured as a multiple of ½ with respect to the wavelength (λ) of an ultrasonic wave emitted from the ultrasonic fingerprint recognition sensor of the electronic device so that the acoustic impedance of the first adhesive layer may match the acoustic impedance of the first substrate layer.

According to various embodiments, the protective film may further include a second substrate layer and a second adhesive layer between the first adhesive layer and the first substrate layer.

According to various embodiments, the second adhesive layer may be formed of a material including at least one of an optical clear adhesive (OCA), a silicone-based adhesive, an acrylic adhesive, and an urethane-based adhesive.

According to various embodiments, the second substrate layer may be formed of a material including at least one of a polyethylene terephthalate (PET) resin, a polypropylene resin, a polyolefin resin, a polyester resin, a polyacrylic resin, and a polycarbonate resin.

According to various embodiments, the second substrate layer may be formed of a material softer than the first substrate layer.

According to various embodiments, at least one of the second adhesive layer and the second substrate layer may be formed to have a thickness of ½nλ with respect to the wavelength (λ) of an ultrasonic wave emitted from the ultrasonic fingerprint recognition sensor of the electronic device.

According to various embodiments, the second adhesive layer and the second substrate layer may be formed to have the same impedance as the impedance of the first substrate layer.

According to various embodiments, the sum of the thicknesses of the first substrate layer, the second adhesive layer, and the second substrate layer may be ½nλ.

According to various embodiments, the protective film may include a flat-type film or an edge-type film.

According to various embodiments disclosed in this document, it is possible to provide an electronic device (e.g., 100 in FIG. 1) including: a housing (e.g., 110 in FIG. 1) including a front plate (e.g., 102 in FIG. 1); a display (e.g., 101 in FIG. 1) mounted on at least one surface of the housing; an ultrasonic fingerprint recognition sensor (e.g., 440 in FIG. 4) configured to emit ultrasonic waves and obtain information related to a user's fingerprint using at least some of the ultrasonic waves reflected; and a protective film (e.g., 500 in FIG. 4) configured to be attached to the front plate, wherein the protective film includes a first adhesive layer (e.g., 510 in FIG. 4) configured to be attached to the front plate and a first substrate layer (e.g., 520 in FIG. 4) stacked on one surface of the first adhesive layer so as to be integral with the first adhesive layer and covering the front plate, and wherein at least one of the first adhesive layer and the first substrate layer is formed to have a thickness of ½nλ with respect to the wavelength (λ) of an ultrasonic wave emitted from the ultrasonic fingerprint recognition sensor of the electronic device.

According to various embodiments, the protective film may further include a second substrate layer and a second adhesive layer between the first adhesive layer and the first substrate layer.

According to various embodiments, the second substrate layer may be formed of a material softer than the first substrate layer.

According to various embodiments, at least one of the second adhesive layer and the second substrate layer may be formed to have a thickness of ½nλ with respect to the wavelength (λ) of an ultrasonic wave emitted from the ultrasonic fingerprint recognition sensor of the electronic device.

According to various embodiments, the second adhesive layer and the second substrate layer may be formed to have the same impedance as the impedance of the first substrate layer.

According to various embodiments, the sum of the thicknesses of the first substrate layer, the second adhesive layer, and the second substrate layer may be ½nλ.

According to various embodiments disclosed in this document, it is possible to provide a protective film (e.g., 700 in FIG. 7A) configured to be attached to an electronic device (e.g., 600 in FIG. 7A) equipped with an ultrasonic fingerprint recognition sensor (e.g., 640 in FIG. 7A), which includes: a first adhesive layer (e.g., 710 in FIG. 7A) configured to be attached to a front plate (e.g., 620 in FIG. 7A) of the electronic device; a second substrate layer (e.g., 740 in FIG. 7A) stacked on top of the first adhesive layer; a second adhesive layer (e.g., 730 in FIG. 7A) stacked on top of the second substrate layer, and a first substrate layer (e.g., 720 in FIG. 7A) stacked on top of the second adhesive layer, wherein at least one of the first adhesive layer, the second substrate layer, the second adhesive layer, and the first substrate layer is formed to have a thickness of ½nλ with respect to the wavelength (λ) of an ultrasonic wave emitted from the ultrasonic fingerprint recognition sensor of the electronic device.

According to various embodiments, the sum of the thicknesses of the first substrate layer, the second adhesive layer, and the second substrate layer may be ½nλ.

As described above, although specific embodiments have been described in the detailed description of the disclosure, it will be obvious to those of ordinary skill in the art that various modifications are possible without departing from the scope of the disclosure.

The invention claimed is:

1. A protective film configured to be attached to an electronic device equipped with an ultrasonic fingerprint recognition sensor, the protective film comprising:
    a first adhesive layer configured to be attached to a front plate of the electronic device; and
    a first substrate layer stacked on the first adhesive layer and covering the front plate,
    wherein at least one of the first adhesive layer and the first substrate layer is formed to have a thickness of ½nλ (where n is an integer n>0) with respect to a wavelength (λ) of an ultrasonic wave emitted from the ultrasonic fingerprint recognition sensor of the electronic device.

2. The protective film of claim 1, wherein the first adhesive layer is formed of a material comprising at least one of a pressure sensitive adhesive (PSA), a silicone-based adhesive, an acrylic adhesive, and an urethane-based adhesive.

3. The protective film of claim 1, wherein the first substrate layer is formed of a material comprising at least one of a polyethylene terephthalate (PET) resin, a polypropylene resin, a polyolefin resin, a polyester resin, a polyacrylic resin, and a polycarbonate resin.

4. The protective film of claim 1, wherein the thickness of at least one of the first adhesive layer and the first substrate layer is configured as a multiple of ½ with respect to the wavelength (λ) of an ultrasonic wave emitted from the ultrasonic fingerprint recognition sensor of the electronic device so that an acoustic impedance of the first adhesive layer matches the acoustic impedance of the first substrate layer.

5. The protective film of claim 1, further comprising a second substrate layer and a second adhesive layer between the first adhesive layer and the first substrate layer.

6. The protective film of claim 5, wherein the second adhesive layer comprises at least one of an optical clear adhesive (OCA), a silicone-based adhesive, an acrylic adhesive, and an urethane-based adhesive.

7. The protective film of claim 5, wherein the second substrate layer is formed of a material comprising at least one of a polyethylene terephthalate (PET) resin, a polypropylene resin, a polyolefin resin, a polyester resin, a polyacrylic resin, and a polycarbonate resin.

8. The protective film of claim 7, wherein the second substrate layer is formed of a material softer than the first substrate layer.

9. The protective film of claim 5, wherein at least one of the second adhesive layer and the second substrate layer is formed to have a thickness of ½nλ (where n is an integer n>0) with respect to the wavelength (λ) of an ultrasonic wave emitted from the ultrasonic fingerprint recognition sensor of the electronic device.

10. The protective film of claim 9, wherein the second adhesive layer and the second substrate layer are formed to have a same impedance as an impedance of the first substrate layer.

11. The protective film of claim 10, wherein a sum of the thicknesses of the first substrate layer, the second adhesive layer, and the second substrate layer is ½nλ where n is an integer n>0).

12. The protective film of claim 5, wherein the second substrate layer is stacked on top of the first adhesive layer,
    wherein the second adhesive layer is stacked on top of the second substrate layer, and
    wherein the first substrate layer is stacked on top of the second adhesive layer.

13. The protective film of claim 1, wherein the protective film comprises a flat-type film or an edge-type film in which at least a portion is curved.

14. An electronic device comprising the protective film according to claim 1, the electronic device comprising:
    a housing comprising a front plate to which the protective film is configured to be attached;
    a display mounted on at least one surface of the housing; and
    an ultrasonic fingerprint recognition sensor configured to emit ultrasonic waves and obtain information related to a user's fingerprint using at least some of the ultrasonic waves reflected by an external object.

15. The electronic device of claim 14, wherein the display is a touch screen display comprising a transparent adhesion layer, a polarizer, and a display panel.

* * * * *